(12) United States Patent
Ehrmaier et al.

(10) Patent No.: US 6,544,144 B2
(45) Date of Patent: Apr. 8, 2003

(54) MOTOR VEHICLE HAVING A TRANSMISSION CONTROLLED BY AN ELECTRONIC TRANSMISSION UNIT

(75) Inventors: Rudolf Ehrmaier, Munich (DE); Josef Neuner, Raubling (DE); Sigmund Fuerst, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/809,437

(22) Filed: Mar. 16, 2001

(65) Prior Publication Data

US 2001/0039232 A1 Nov. 8, 2001

(30) Foreign Application Priority Data

Mar. 16, 2000 (DE) .......................... 100 12 833

(51) Int. Cl.⁷ .......................... F16H 61/12; F16H 59/08
(52) U.S. Cl. ........................ 477/110; 477/906
(58) Field of Search ................ 477/906, 110, 477/174; 74/732.1, 336 R

(56) References Cited

U.S. PATENT DOCUMENTS

| | | |
|---|---|---|
| 4,838,124 A | 6/1989 | Hamano |
| 5,405,303 A | 4/1995 | Takada |
| 5,885,187 A | 3/1999 | Tabata .......................... 477/107 |
| 6,167,343 A * | 12/2000 | Bauerle ....................... 123/350 |

FOREIGN PATENT DOCUMENTS

| | | |
|---|---|---|
| DE | 197 47 270 A1 | 10/1997 |
| DE | 198 10 479 A1 | 3/1998 |
| DE | 19810479 | 9/1999 |
| JP | 5-104989 A | 4/1993 |
| WO | WO 99/46520 | 2/1999 |

OTHER PUBLICATIONS

Copy of International Search Report.

* cited by examiner

*Primary Examiner*—Jack Lavinder
*Assistant Examiner*—C. T. Bartz
(74) *Attorney, Agent, or Firm*—Crowell & Moring LLP

(57) ABSTRACT

A motor vehicle has a transmission controlled by an electronic transmission unit and an internal-combustion engine controlled by an electronic engine unit. The transmission unit normally shifts the selected gear by controlling actuators in the transmission, as a function of the adjustment of a gear selection switch. In an emergency, which can be detected by the engine unit via a communication connection with the transmission unit, and in which the adjustment of the gear selection switch is not detected by the transmission unit and/or the selected gear cannot be shifted in the transmission, the engine unit enforces a limitation of vehicle acceleration.

7 Claims, 2 Drawing Sheets

MOTOR VEHICLE HAVING A TRANSMISSION CONTROLLED BY AN ELECTRONIC TRANSMISSION UNIT

BACKGROUND AND SUMMARY OF THE INVENTION

This application claims the priority of German patent document 100 12 833.5, filed Mar. 16, 2000, the disclosure of which is expressly incorporated by reference herein.

The invention relates to a motor vehicle having a transmission controlled by an electronic transmission unit and an internal-combustion engine controlled by an electronic engine unit.

The transmission unit and the engine unit can be combined in one control unit or can consist of two separate control units. In each case, a communication connection—in the case of two separate control units, particularly in the form of a digital data bus (for example, a CAN bus)—is provided between the transmission unit and the engine unit. Conventionally, the transmission unit, normally as a function of a gear selection switch, shifts the selected gear by controlling actuators in the transmission. Here, the term "gear selection switch" is to be understood in the widest sense, specifically, for example, as a selector switch for a driving position in the case of a (semi) automatic manual transmission (1st gear, 2nd gear . . . , reverse gear, neutral position) as well as a selector switch for a driving position (P, R, N, D . . . ) in the case of an automatic transmission.

In new electronically controlled transmissions, currently, a mechanical connection is no longer provided between the electrical or electronic gear selection switch and the transmission. Rather, a purely electrical signal communication takes place between the gear selection switch and the transmission unit. Thus, in the event of a defect of the gear selection switch or an interruption of the signal transmission line between the gear selection switch and the transmission unit, the adjustment of the gear selection switch can no longer be recognized. The transmission unit will then control the transmission in an emergency operation in which, under certain circumstances, the selected gear (the selected position) is simply maintained. As a result, a change of the driving direction which might simply be desired by the driver would not be implemented.

Furthermore, the transmission control unit itself may be defective, so that the selected gear, corresponding to the adjustment of the gear selection switch, cannot be shifted in the transmission by means of the transmission control unit. When the transmission unit fails completely, so-called mechanical emergency operation takes place in which, also under certain circumstances, the selected gear (the selected position) is maintained, and an intended change of driving direction is not implemented.

In such emergency operation situations, it is also known to warn the driver by corresponding feedback. (Compare, for example, German Patent Document DE 198 10 479 A1.) However, it is possible that in particular cases the driver may overlook or not hear this feedback.

It is an object of the invention to increase the degree of safety in a vehicle such as described above, especially with regard to the above-described emergency operation situation.

This and other objects and advantages are achieved by the control system according to the invention, in which the engine unit imposes a limitation on the acceleration of the vehicle upon the occurrence of an emergency that can be detected by way of the communication connection, including a situation in which the adjustment of the gear selection switch is not recognized by the transmission unit and/or the selected gear cannot be shifted in the transmission. The term "gear" can be a particular reverse or forward gear (R-gear or, for example, 1st gear) as well as a reverse or forward driving position ("R" or, for example, "D")

The emergency is preferably detected by the engine unit when the transmission unit actively emits a corresponding emergency signal to the communication connection. Alternatively, or in addition, the emergency can be detected by the engine unit when the transmission unit emits no signals, or implausible signals to the communication connection.

In the case of the first alternative, it is more likely that a defect that can be detected by the transmission unit exists in the gear selection switch or in the signal transmission line between the gear selection switch and the transmission unit. In this case, the transmission unit can activate a defined emergency operation, for example, holding the gear which was engaged before the defect. In such a case, the transmission unit knows which gear is engaged, and the actively emitted emergency signal could be emitted only when and as long as a reverse or forward gear is actually held. However, if the defined emergency operation activates the engagement of the neutral position, the emission of an emergency signal is not absolutely necessary in order to trigger the limiting function according to the invention in the engine unit, because it would have no effect in the neutral position.

In the second embodiment, there is more of a total failure of the transmission unit. In this case, the engine unit must assume the worst case and carry out the limiting function itself. Particularly by limiting the torque of the internal-combustion engine, the limitation of the acceleration is carried out as a function of the time, the vehicle path and/or its speed.

The limiting function according to the invention is preferably begun during the start of the drive or at a speed below a very low threshold value.

Other objects, advantages and novel features of the present invention will become apparent from the following detailed description of the invention when considered in conjunction with the accompanying drawings.

DETAILED DESCRIPTION OF THE DRAWINGS

Figure 1:
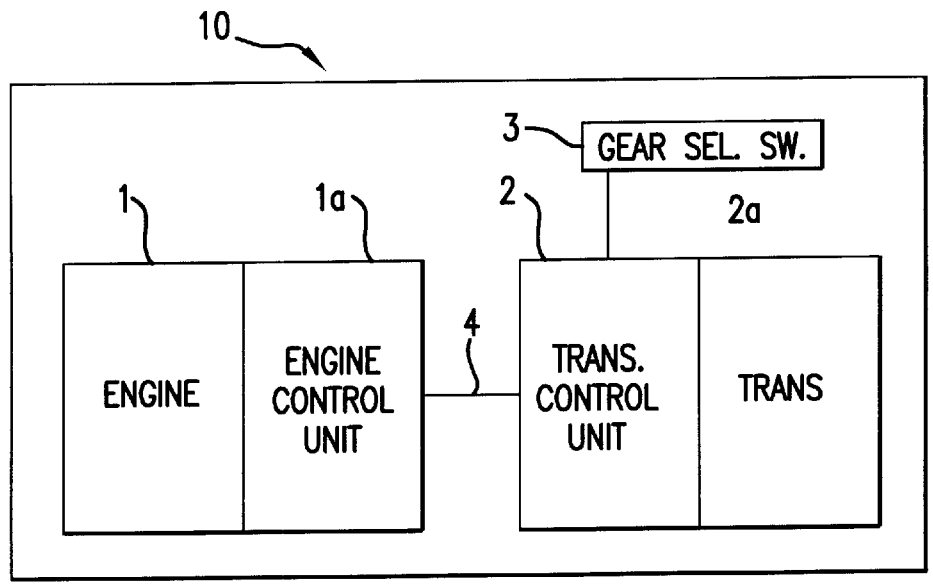
FIG. 1 is a schematic depiction of an automobile having an engine control unit and a transmission control unit according to the invention.

FIG. 1 is a schematic depiction of an automobile 10 having an engine 1 controlled by an engine control unit 1a, as well as a transmission control unit 2 which controls a transmission 2a, based on an input from the gear selection switch 3. Communication between the transmission control unit and the engine control unit is provided via a communication connection 4.

Figure 2:
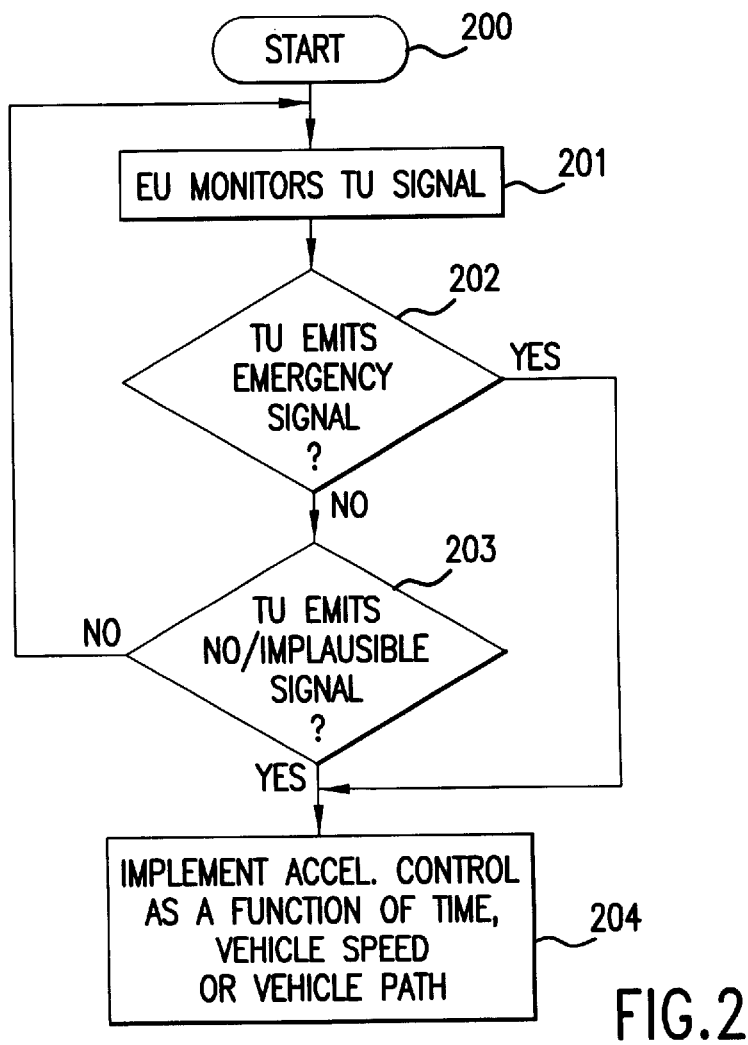
FIG. 2 is a flow chart which illustrates the process performed by the engine control unit according to the invention.

FIG. 2 is a flow chart which depicts the process implemented by the respective control units according to the invention. When the process starts (step 200), the engine unit monitors signals generated by the transmission unit (step 201). In step 202, the engine unit determines whether the transmission unit has emitted an emergency signal. If so, acceleration control, as described hereinafter, is implemented in step 204. If not, on the other hand, then the engine unit further determines whether the transmission unit emits either no signals at all, or an implausible signal. If so, acceleration control is once again implemented in step 204, as a function of time, vehicle path or vehicle speed. If not, however, the process returns to step 200, and is repeated.

Figure 3:
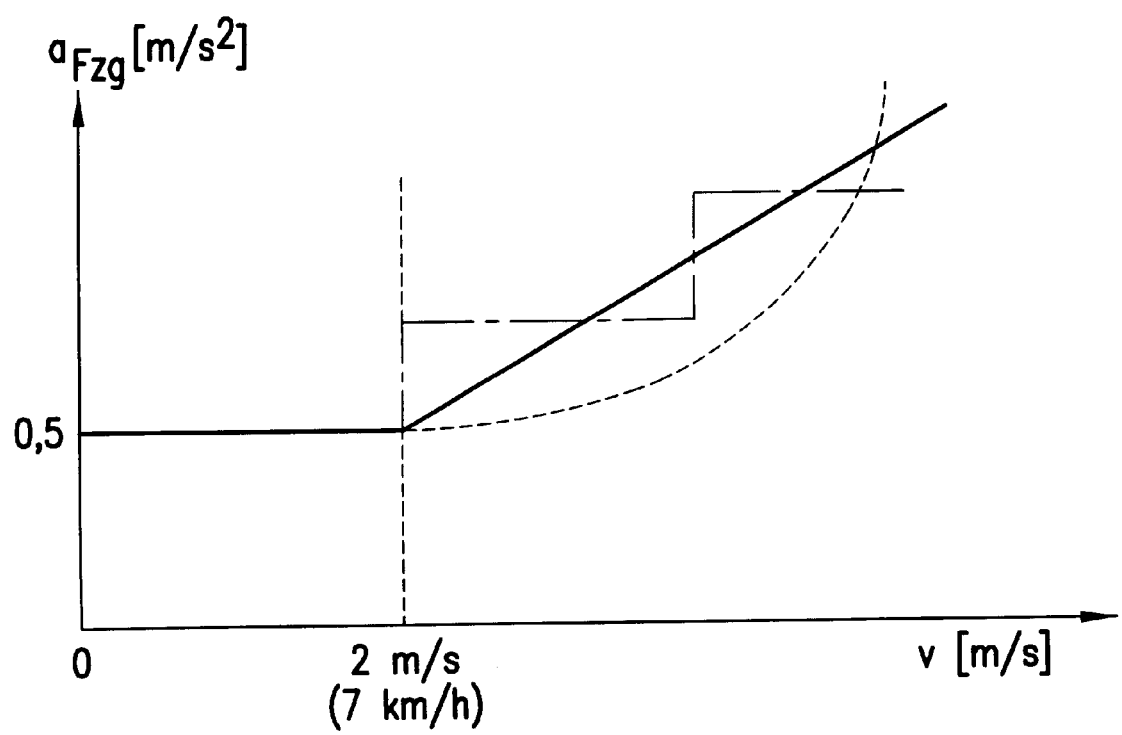
FIG. 3 is a graph that illustrates the operation of an embodiment of the invention, showing a limitation of the acceleration according to the invention in the form of a start acceleration limitation.

In FIG. 3, vehicle speed v is entered on the abscissa, and vehicle acceleration $a_{FZG}$ is entered on the ordinate. Limitation of acceleration is implemented by defining a maximum permissible limitation curve. In this case, for speeds below a defined speed value v=7 km/h (or 2 m/s) the acceleration is held constant at 0.5 m/s². The limitation curve then rises preferably linearly. However, the limitation curve may assume any shape, for example, continuously rising (broken line) or rising in a step shape (dash-dotted line).

The limitation function can also be switched off after a defined route has been covered or after a defined speed or acceleration has been reached (not shown). The limitation function is carried out in a known manner by means of a torque limitation that is implemented, for example, by controlling the ignition point, the injection period and/or the position of a throttling element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having an internal-combustion engine controlled by an electronic engine unit, a transmission, a transmission unit which normally controls the transmission as a function of adjustment of a gear selection switch, shifting a selected gear by controlling actuators in the transmission, and a communication connection between the transmission unit and the engine unit, wherein:

based on a communications state of the communication connection, the engine unit detects occurrence of an emergency in which adjustment of the gear selection switch is not detected by the transmission unit or a selected gear cannot be shifted in the transmission;

in response to detection of an emergency, the engine unit implements a limitation of vehicle acceleration.

2. The motor vehicle according to claim 1, wherein the engine unit detects an emergency in response to the transmission unit's actively emitting an emergency signal to the communication connection.

3. The motor vehicle according to claim 1, wherein said communications state based on which the engine unit detects an emergency includes the transmission unit's emitting either no signals or implausible signals to the communication connection.

4. The motor vehicle according to claim 1, wherein the limitation of vehicle acceleration is performed as a function of at least one of time, vehicle path and vehicle speed.

5. A method of operating a vehicle having an electronic engine control unit, a transmission, a transmission control unit coupled to the engine control unit via a communications connection and a gear selector switch coupled to the transmission control unit, said method comprising:

during normal operation of the vehicle, said transmission control unit causing said transmission to shift into a selected gear in response to an input from said gear selector switch;

said engine control unit monitoring signals or absence of signals transmitted from said transmission control unit to detect an emergency situation in which a gear selection from the gear selection switch is not detected by the transmission control unit or a selected gear cannot be shifted in the transmission; and in response to said engine control unit's detection of an emergency situation, said engine control unit implementing a limitation on vehicle acceleration.

6. A method according to claim 5, wherein said engine control unit detects an emergency in response to the transmission control unit's emission of an emergency signal via the communications connection.

7. A method according to claim 5, wherein said engine control unit detects an emergency whenever the transmission control unit emits either no signals or implausible signals via the communications connection.

* * * * *